United States Patent [19]
Williams

[11] Patent Number: 5,718,275
[45] Date of Patent: Feb. 17, 1998

[54] WATER SHIELD

[76] Inventor: Glenn R. Williams, 618 E. Main St., Blytheville, Ark. 72315

[21] Appl. No.: 736,419

[22] Filed: Oct. 24, 1996

[51] Int. Cl.$^6$ ............................................. E05D 15/26
[52] U.S. Cl. .................... 160/199; 160/188; 160/184
[58] Field of Search ......................... 160/199, 184, 160/188, 236, 330, 332; 134/250, 114

[56]  References Cited

U.S. PATENT DOCUMENTS

| | | | |
|---|---|---|---|
| 1,736,390 | 11/1929 | Brubaker | 160/188 |
| 3,038,481 | 6/1962 | Brechtel . | |
| 3,096,775 | 7/1963 | Clarke et al. . | |
| 3,179,117 | 4/1965 | Gibson et al. . | |
| 3,249,150 | 5/1966 | Knight | 160/184 |
| 3,331,425 | 7/1967 | Groves et al. | 160/184 X |
| 4,135,533 | 1/1979 | Gall et al. . | |
| 4,232,725 | 11/1980 | Gidge | 160/332 |
| 4,427,049 | 1/1984 | Belanger et al. | 160/199 |
| 4,432,406 | 2/1984 | Belanger et al. | 160/199 |
| 4,711,257 | 12/1987 | Kobayashi . | |
| 4,867,798 | 9/1989 | Weikmann . | |
| 5,040,485 | 8/1991 | Bailey et al. . | |
| 5,160,430 | 11/1992 | Gasser et al. . | |
| 5,335,710 | 8/1994 | Belanger | 160/199 X |
| 5,413,128 | 5/1995 | Butts . | |

FOREIGN PATENT DOCUMENTS 3518298  11/1986  Germany .

*Primary Examiner*—Blair Johnson
*Attorney, Agent, or Firm*—Richard C. Litman

[57]  ABSTRACT

Water shield panels which are used in a car wash. The panels prevent water from dripping onto a header over the exit of a car wash. The exit is covered by a door which is made of plastic strips. The water shield panels capture the water during the wash. After the wash and before the car exits the car wash, the panels and the door are opened to avoid dripping water or soap onto the exiting car and to allow it to exit. The panels and the door are folded open by a motor and push/pull rods. The plastic strips making up the door are covered with carpet at their lower ends to prevent their scratching of a car when it exits when the motor is not functioning.

5 Claims, 5 Drawing Sheets

WATER SHIELD

BACKGROUND OF THE INVENTION

1. Field of the Invention

The present invention relates to spray shields and, more specifically, to water shields which protect automobiles from dripping water upon exiting from a car wash.

2. Description of the Prior Art

The instant invention relates to water shield panels which prevent water from dripping onto a header over the exit of a car wash. The water shield panels capture the water during the wash. After the wash and before the car exits the car wash, the panels are opened so that they cannot drip water or soap onto the exiting car. The invention also includes a door covering the exit of the car wash which opens with the panels. The panels and the door are folded open by a motor and push/pull rods.

A car wash having motorized doors is seen in U.S. Pat. No. 3,038,481, issued on Jun. 12, 1962 to R. E. Brechtel. The Brechtel patent suffers from the disadvantage of many other prior patents, which include U.S. Pat. Nos. 3,096,775, issued on Jul. 9, 1963 to H. W. Clarke et al., U.S. Pat. No. 3,179,117, issued on Apr. 20, 1965 to R. R. Gibson et al., U.S. Pat. No. 4,135,533, issued on Jan. 23, 1979 to Herbert J. Gall et al., U.S. Pat. No. 4,711,257, issued on Dec. 8, 1987 to Minoru Kobayashi, U.S. Pat. No. 4,867,798, issued on Sep. 19, 1989 to Guenther Weikmann, U.S. Pat. No. 5,040,485, issued on Aug. 20, 1991 to James Bailey et al. U.S. Pat. No. 5,160,430, issued on Nov. 3, 1992 to William J. Gasser et al., and U.S. Pat. No. 5,413,128, issued on May 9, 1995 to James N. Butts, and German Patent No. 3,518,298, issued on Nov. 27, 1986, in that they do not have water shields. The lack of water shields, especially ones that open, results in car washes that leave spots on the cars due to water and soap dripping on the car during its exit from the wash.

None of the above inventions and patents, taken either singly or in combination, is seen to describe the instant invention as claimed.

SUMMARY OF THE INVENTION

The present invention relates to water shield panels which are used in a car wash. The panels prevent water from dripping onto a header over the exit of a car wash. The exit is covered by a door which is made of plastic strips. The water shield panels capture the water during the wash. After the wash and before the car exits the car wash, the panels and the door are opened to avoid dripping water or soap onto the exiting car and to allow it to exit. The panels and the door are folded open by a motor and push/pull rods. The plastic strips making up the door are covered with carpet at their lower ends to prevent their scratching of a car when it exits when the motor is not functioning.

Accordingly, it is a principal object of the invention to provide water shields to prevent water from getting onto the header of the exit during the wash.

It is another object of the invention to provide a mechanism to open the water shields so they will not drip onto an exiting car.

It is a further object of the invention to provide a door on the exit which will eliminate washing complications due to wind and other weather.

Still another object of the invention is to provide a mechanism to open the door to allow the car to exit and to provide means to prevent scratching of the car in the event the door cannot open.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
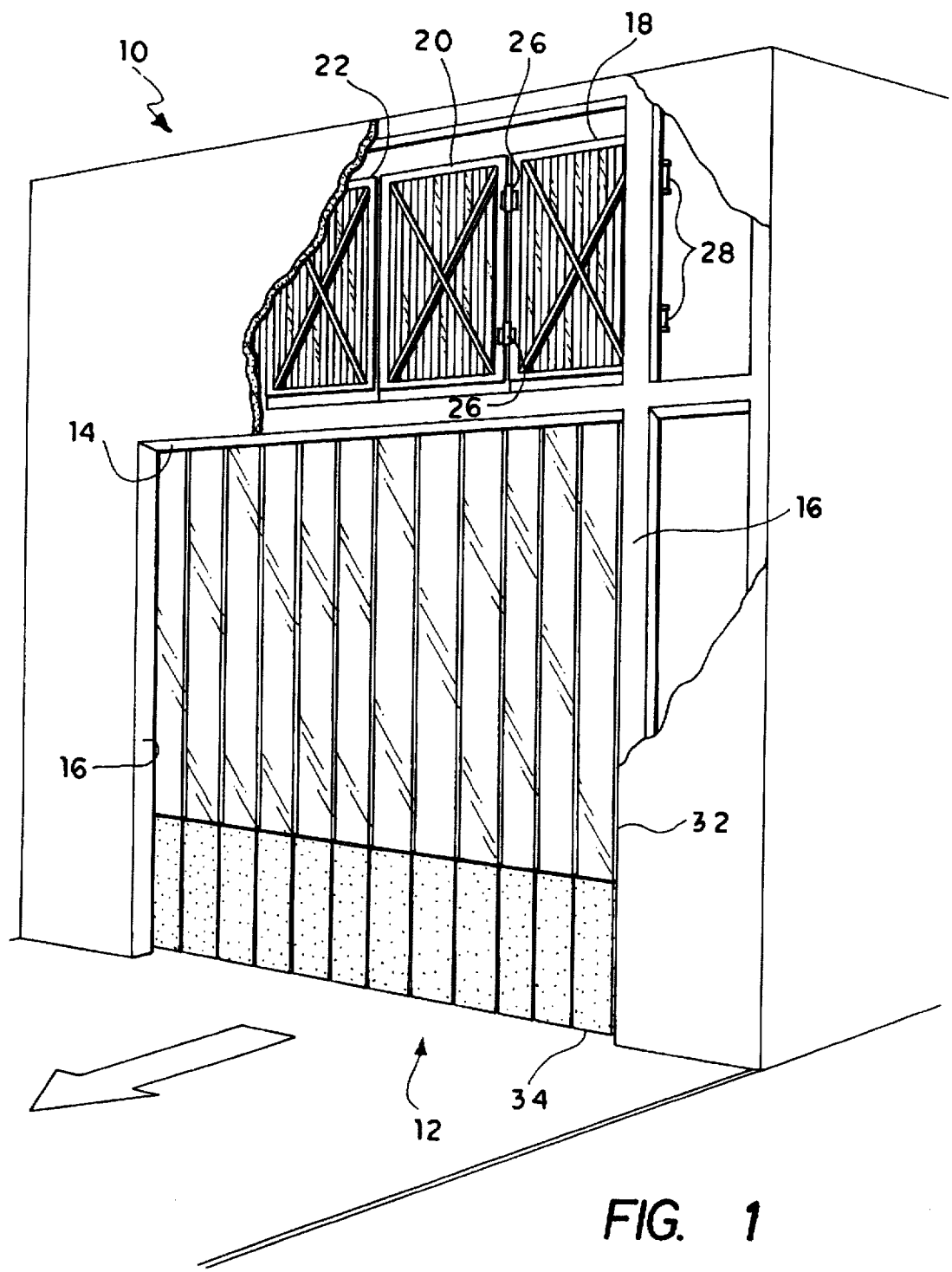
FIG. 1 is a front perspective view of the water shield panels and the doors in a closed position.

FIG. 1 shows the exit of a car wash 10 having a doorway 12 defined by header 14 extending between a pair of door jambs 16, 16. Above the header 14 are four water shield panels 18, 20, 22, and 24. These panels, which are preferably plastic strips over a pair of metal cross bars, capture the soap and water used in the car wash 10 and prevent it from dripping on the header 14 and, ultimately, the vehicle upon its exit from the car wash 10.

Figure 3:
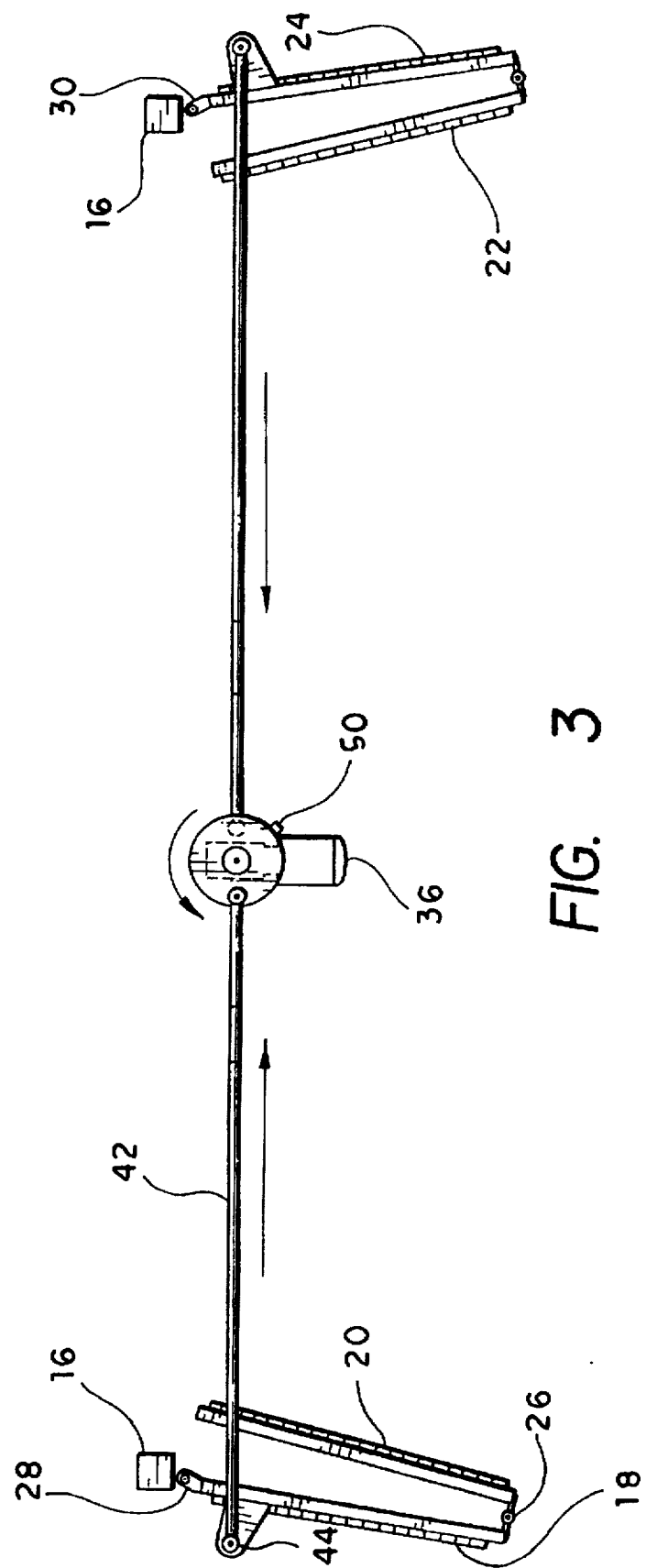
FIG. 3 is a top view of the water shield panels and the opening system in the open position.
Figure 4:
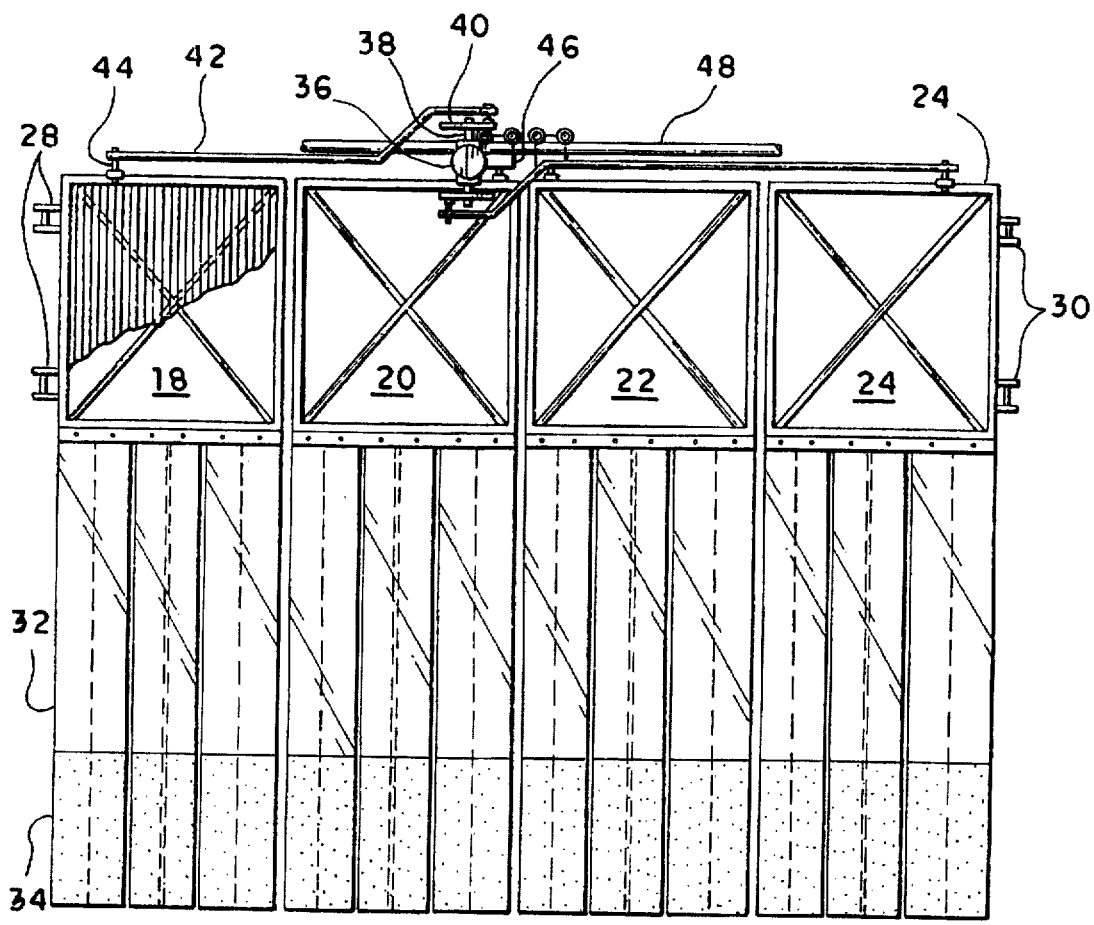
FIG. 4 is a rear view of the water shield panels and the door in the closed position.
Figure 5:
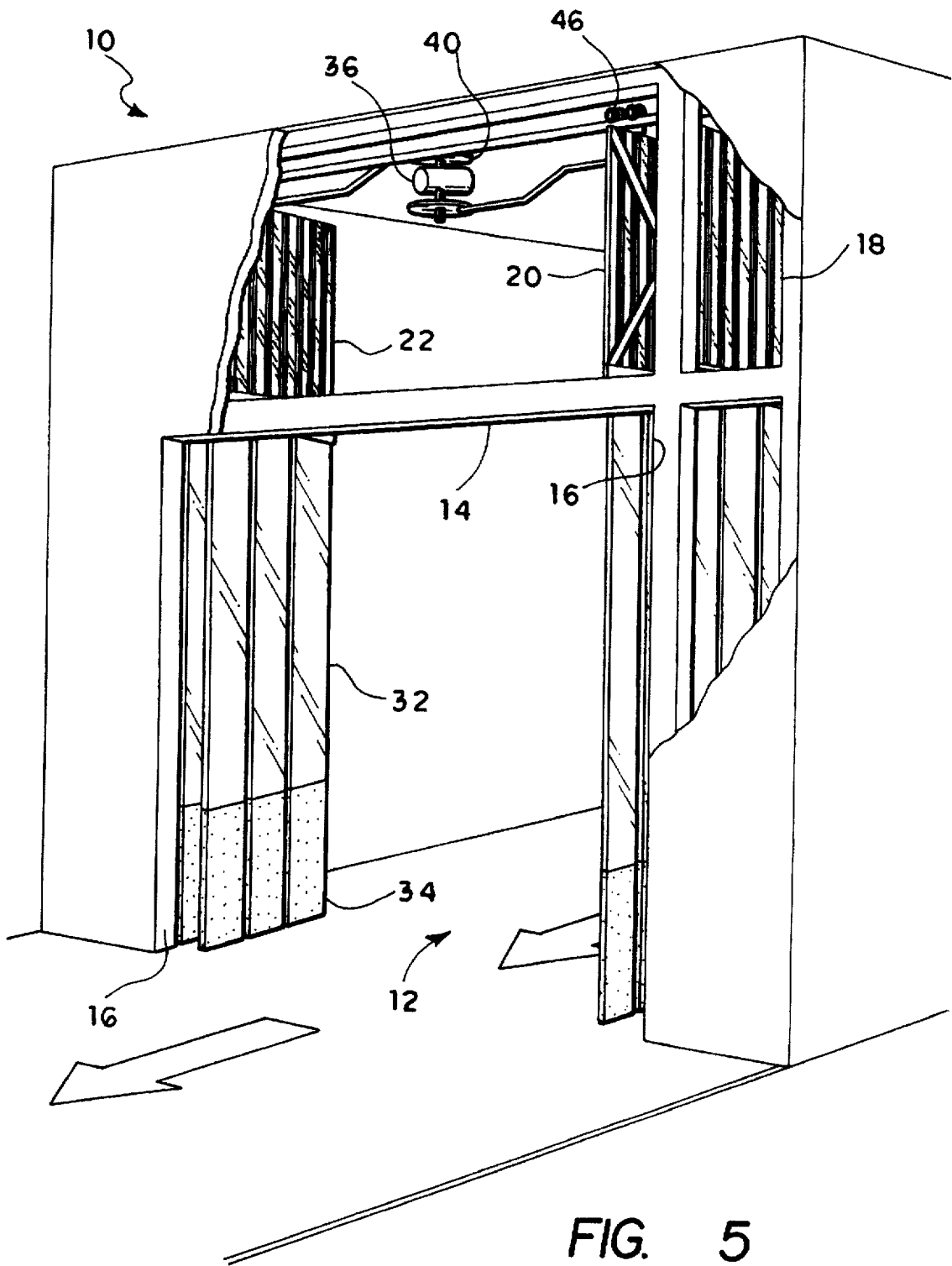
FIG. 5 is a front perspective view of the water shield panels and the doors in an open position.

These water shield panels pivot towards the door jambs 16,16 (as shown in FIGS. 3 and 5) and away from the doorway 12 during a vehicle's exit. Therefore, soap and water cannot drip on a vehicle at the header 14 and cause water spots and streaks on the vehicle. The two left water shield panels 18 and 20 are attached by a pair of pivot hinges 26,26 and fold into one another (as seen in FIG. 5) pivoting about these hinges 26,26 and door jamb hinges 28,28. The right panels 22 and 24 are also connected to each other by a pair of pivot hinges. The right panels 22 and 24 pivot about these hinges and a pair of door jamb hinges 30,30 (shown in FIG. 4).

As seen in FIG. 4, each water shield panel has a plurality of plastic strips 32 attached to its lower end. These plastic strips 32 form a door covering the doorway 12. This door helps to keep out the elements and eliminates the problems caused by foul weather. Because the strips 32 are attached to the panels, the door will open with the panels. Each strip 32 has a length of carpet 34 attached to its lower portion on either side of the strip 32. This carpet 34 serves to protect the vehicle from scratches in the event the vehicle must exit without the door's opening, e.g., in a power failure.

Figure 2:
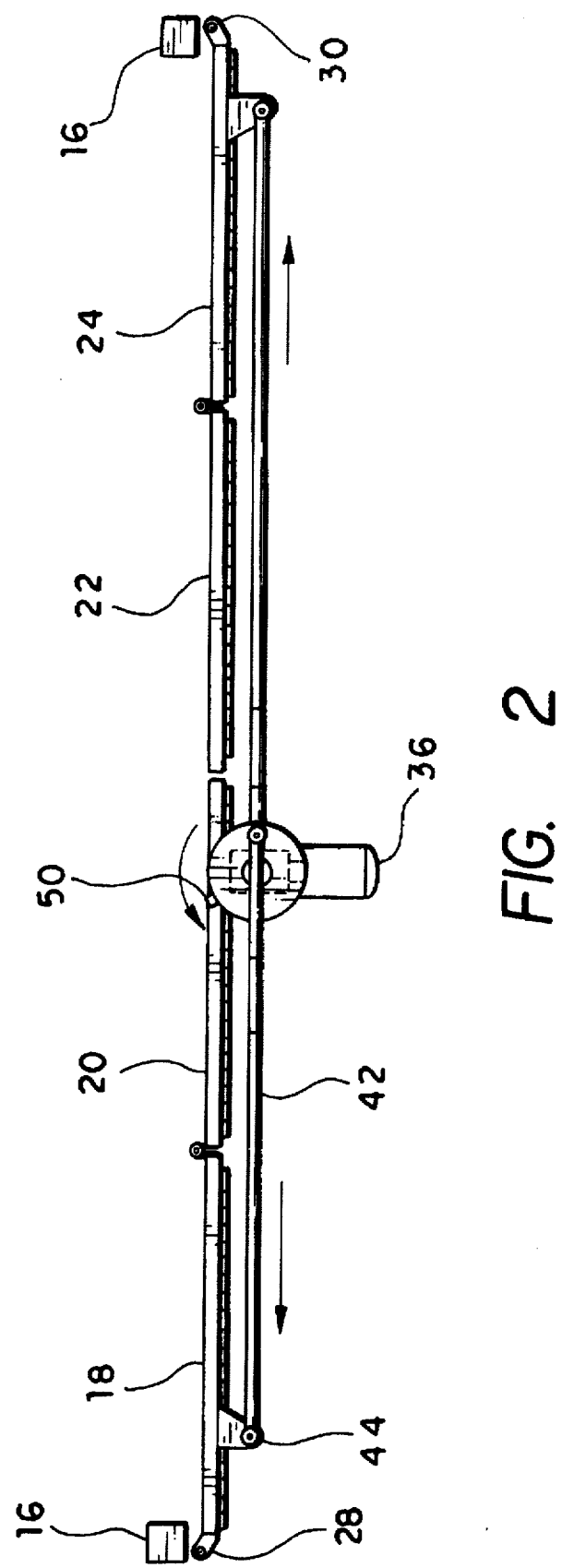
FIG. 2 is a top view of the water shield panels and the opening system in the closed position.

The mechanism for opening and closing the panels and the door is best seen in FIG. 4. To open the panels and the door, the motor 36 rotates the upper shaft 38 and the upper disc 40, which is attached to the upper rod 42 is pushed from its location in FIG. 2 to that in FIG. 3. The pivot bracket 44 is pushed from its position in FIG. 2 to that in FIG. 3, opening the panel 18 and pulling the panel 20 towards it by pivot hinges 26,26. The roller assembly 46 attached to panel 20 rolls along the pipe guide 48 causing the panel 20 to fold into the panel 18. The right panels 22 and 24 open in the same manner as the left panels 18 and 20, based on the rotation of the lower disc.

A further rotation of the discs closes the panels. The rotation of the discs are limited by a stop switch target 50 located on the upper disc 40. The motor stops functioning when the stop switch target 50 is above one of two proximity limiting switches (not shown) located 180 degrees apart.

It is to be understood that the present invention is not limited to the sole embodiment described above, e.g., the spray shields can be used with spray booths, but encompasses any and all embodiments within the scope of the following claims.

I claim:

1. In a car wash having an exit including a doorway and a header, the improvement comprising a plurality of water shield panels, each of said water shield panels being disposed completely above said header, a plurality of plastic strips attached to each of said water shield panels and covering said doorway, and means for opening and closing said water shield panels and said plurality of plastic strips, whereby said water shield panels prevent water from dripping on said header.

2. The car wash of claim 1 wherein each of said water shield panels includes a plurality of plastic strips reinforced by a pair of diagonal cross bars.

3. The car wash of claim 1 wherein said plurality of water shield panels includes a plurality of right water shield panels hinged together and a plurality of left water shield panels hinged together, and said means for moving said plurality of water shield panels includes drive means for pivoting said right water shield panels and said left water shield panels to an opened and closed position.

4. The car wash of claim 3 wherein said plurality of water shield panels includes a pair of right water shield panels and a pair of left water shield panels.

5. The car wash of claim 1 wherein said means for opening and closing said water shield panels and said plurality of plastic strips includes a pair of pivot arms, each of said arms connected at one end to a disc driven by a motor, and another end to one of said plurality of panels, such that when said disc is rotated, each of said arms is linearly actuated.

* * * * *